(12) United States Patent
Sandbach

(10) Patent No.: US 6,333,736 B1
(45) Date of Patent: Dec. 25, 2001

(54) DETECTOR CONSTRUCTED FROM FABRIC

(75) Inventor: David L. Sandbach, London (GB)

(73) Assignee: Electrotextiles Company Limited, Iver Heath (GB)

( * ) Notice: Subject to any disclaimer, the term of this patent is extended or adjusted under 35 U.S.C. 154(b) by 0 days.

(21) Appl. No.: 09/315,138

(22) Filed: May 20, 1999

(51) Int. Cl.$^7$ .............................. G09G 5/00; G08C 21/00
(52) U.S. Cl. ...................... 345/178; 345/173; 178/18.05; 178/18.03
(58) Field of Search ..................... 345/173–183, 345/104; 178/18.01–18.11, 19.01–19.07

(56) References Cited

U.S. PATENT DOCUMENTS

| | | | |
|---|---|---|---|
| 3,911,215 | 10/1975 | Hurst et al. | 178/18 |
| 4,220,815 | 9/1980 | Gibson et al. | 178/18 |
| 4,503,286 | 3/1985 | Kubo et al. | 345/174 |
| 4,570,149 | * 2/1986 | Thornburg et al. | 338/114 |
| 4,659,873 | 4/1987 | Gibson et al. | 178/18.05 |
| 4,687,885 | 8/1987 | Talmage, Jr. et al. | 178/18.05 |
| 4,707,845 | 11/1987 | Krein et al. | 178/19 |
| 4,798,919 | 1/1989 | Miessler et al. | 178/18 |
| 4,897,511 | 1/1990 | Itaya et al. | 178/18.05 |
| 4,963,703 | 10/1990 | Phillips et al. | 178/20.02 |
| 5,008,497 | 4/1991 | Asher | 178/18.05 |
| 5,159,159 | 10/1992 | Asher | 178/18.05 |
| 5,262,778 | 11/1993 | Saunders | 341/34 |
| 5,324,895 | * 6/1994 | Inamori et al. | 178/18 |
| 5,453,941 | 9/1995 | Yoshikawa | 345/173 |
| 5,686,705 | 11/1997 | Conroy et al. | 178/19 |
| 5,815,139 | 9/1998 | Yoshikawa et al. | 345/157 |
| 5,852,260 | 12/1998 | Yoshikawa | 345/173 |

FOREIGN PATENT DOCUMENTS

| | | |
|---|---|---|
| 0032013 A1 | 7/1981 | (EP) . |
| 0134853 A1 | 3/1985 | (EP) . |
| 0161895 A2 | 11/1985 | (EP) . |
| 0172783 A2 | 2/1986 | (EP) . |
| 1308575 | 2/1973 | (GB) . |
| 1331942 | 9/1973 | (GB) . |
| 2115555 A | 9/1983 | (GB) . |
| 2341929 A | 3/2000 | (GB) . |

* cited by examiner

*Primary Examiner*—Lun-Yi Lao
(74) *Attorney, Agent, or Firm*—Nixon & Vanderhye P.C.

(57) ABSTRACT

The position of a mechanical interaction in a sensor constructed from fabric is detected. A substantially constant electric current is established through elements of the fabric. A first electrical potential developed in a first plane is measured in response to such current. A second electrical potential developed in a second plane is also measured in response to the current. Then the measurements are processed to identify a position of the mechanical interaction. A calibration circuit is connected to provide an alternative route for current flow through the first plane and through the second plane.

16 Claims, 14 Drawing Sheets

DETECTOR CONSTRUCTED FROM FABRIC

FIELD OF THE INVENTION

The present invention relates to a detector constructed from fabric having electrically conductive elements to define at least two electrically conductive planes.

INTRODUCTION TO THE INVENTION

A fabric touch sensor for providing positional information is described in U.S. Pat. No. 4,659,873 of Gibson. The sensor is fabricated using at least one resistive fabric layer in the form of conducting threads. This fabric is constructed using either uni-directional threads or crossed threads formed by overlaying one set with another or weaving the two sets together. The fabric is separated from a second resistive layer to prevent unintentional contact by separators in the form of non-conducting threads, insulator dots or with an air gap. Both resistive layers are fabrics formed from conductive threads such that no pre-forming is required in order to adapt the sensor to a contoured object.

A problem with the sensor described in the aforesaid United States patent is that it is only capable of identifying the location of the mechanical interaction and cannot provide additional information about the interaction.

A touch sensor for providing positional information is described in U.S. Pat. No. 4,487,885 of Talmage, which also provides a signal dependent upon the pressure or force applied. However, the sensor described is made from a printed circuit board and a flexible sheet of rubber, elastomer or plastic and as such it does not have the many physical qualities that a fabric may provide.

An improvement to this proposal is disclosed in the applicant's copending British patent application number 98 20 902.6 in which there is provided a position detector constructed from fabric having electrically conductive elements, comprising at least two electrically conductive planes. A potential is applied across at least one of the planes to determine the position of a mechanical interaction. In addition, a second electrical property is determined, such as current, to identify additional properties of the mechanical interaction, such as an applied force, an applied pressure or an area of contact.

The position detector, constructed from fabric, facilitates bending and folding operations. However, a problem with the disclosed construction is that the electrical characteristics of the detector are unreliable if the detector planes are folded or distorted beyond modest operational conditions. Certain folding or bending of the sensor can cause pressures within the fabric similar in magnitude to those pressures desired to be measured, leading to undesirable output response characteristics.

A further limitation of the aforementioned disclosures, is that switching arrangements employed to perform position detection may result in undesirable radio frequency emissions. In the particular case of a fabric position detector, It may be desirable to have the fabric in close proximity to an operator, possibly being worn as an article of clothing. Under these circumstances, radio frequency emissions must be kept to a level that may not be achievable using the disclosed detector arrangements.

SUMMARY OF THE INVENTION

According to the present invention, there is provided a method of detecting the position of a mechanical interaction in a sensor constructed from fabric, wherein a substantially constant electric current is established through said elements, including steps of measuring a first electrical potential developed in a first plane in response to said current; measuring a second electrical potential developed in a second plane in response to said current; and processing said measurements to identify a position of said mechanical interaction.

DETAILED DESCRIPTION OF THE PREFERRED EMBODIMENTS

The invention will now be described by way of example only with reference to the previously identified drawings.

Figure 1:
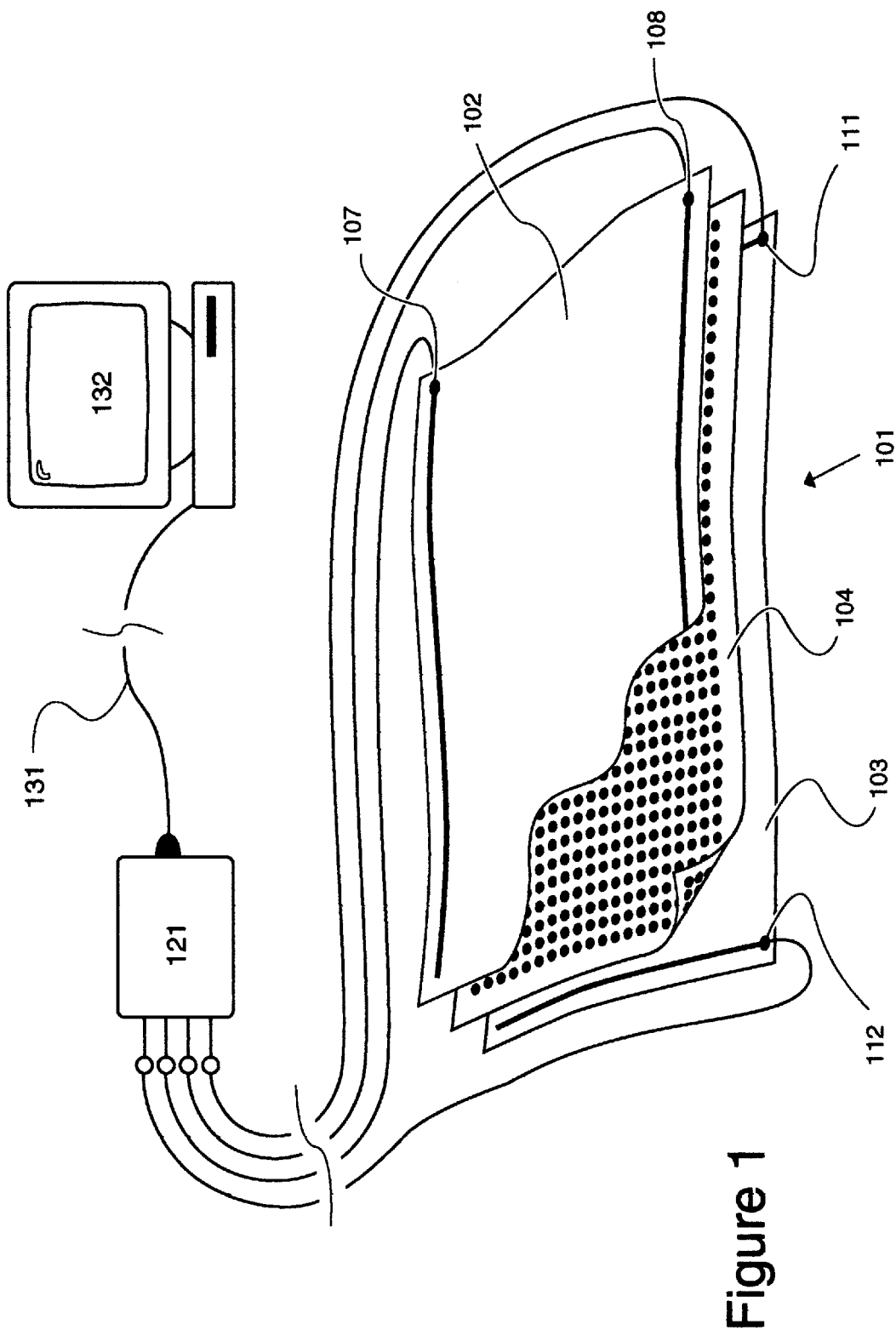
FIG. 1 shows a position detector constructed from fabric, including outer planes, a central layer and a control circuit.

A position detector 101 constructed from fabric is shown in FIG. 1. The detector has two electrically conducting fabric planes, in the form of a first plane 102 and a second plane 103. The planes are separated from each other by means of a partially conductive central layer 104. Partial conduction may be achieved in accordance with one or several of a plurality of arrangements, to be described later.

When force is applied to an area of the sensor, the two outer conducting planes 102 and 103 are brought into contact with central layer 104. The central layer is partially conductive, and, therefore, electrical current may flow between planes 102 and 103 in the region where the force has been applied. It is then possible to identify properties relating to a mechanical interaction.

The planes 102, 103 and preferably the central layer 104 are constructed from fabric, which may be woven, non-woven (felted), knitted or a composite structure. The fabric layers may be manufactured separately and then combined to form the detector or the whole structure may be created as part of the textile manufacture process.

When a voltage is applied across terminals 107 and 108, a voltage gradient appears across plane 102. When a mechanical interaction takes place, plane 103 is brought into electrical contact with plane 102 via the central layer 104, and the actual voltage applied to plane 103 will depend upon the y axis position of the interaction. In drawing in FIG. 1, the y axis is approximately vertical, with the x axis horizontal. Similarly, when a voltage is applied between connectors 111 and 112, a voltage gradient will appear across plane 103 and mechanical interaction will result in a voltage being applied to plane 102. The voltage applied to plane 102 will depend upon the x axis position of the interaction. In this way, for an area of mechanical interaction, it is possible to Identify a location within the plane with reference to the two aforesaid voltage measurements. If the electrical resistance between terminals 111 and 108 is measured, a reading relating to the applied pressure is obtained. Variations in this reading due to variations in x and y position may be reduced by also measuring the electrical resistance between terminals 107 and 112. Thus, connectors 107, 108, 111 and 112 are connected to a control circuit 121, configured to apply signals to the detector 101 and to make measurements of electrical properties that vary in response to mechanical interactions.

Control circuit 121 identifies electrical characteristics of the sensor 101 and in response to these identifications, data relating to the characteristics of the sensor environment are supplied to a data processing system, such as a computer 132, via a conventional serial interface 131.

Figure 2:
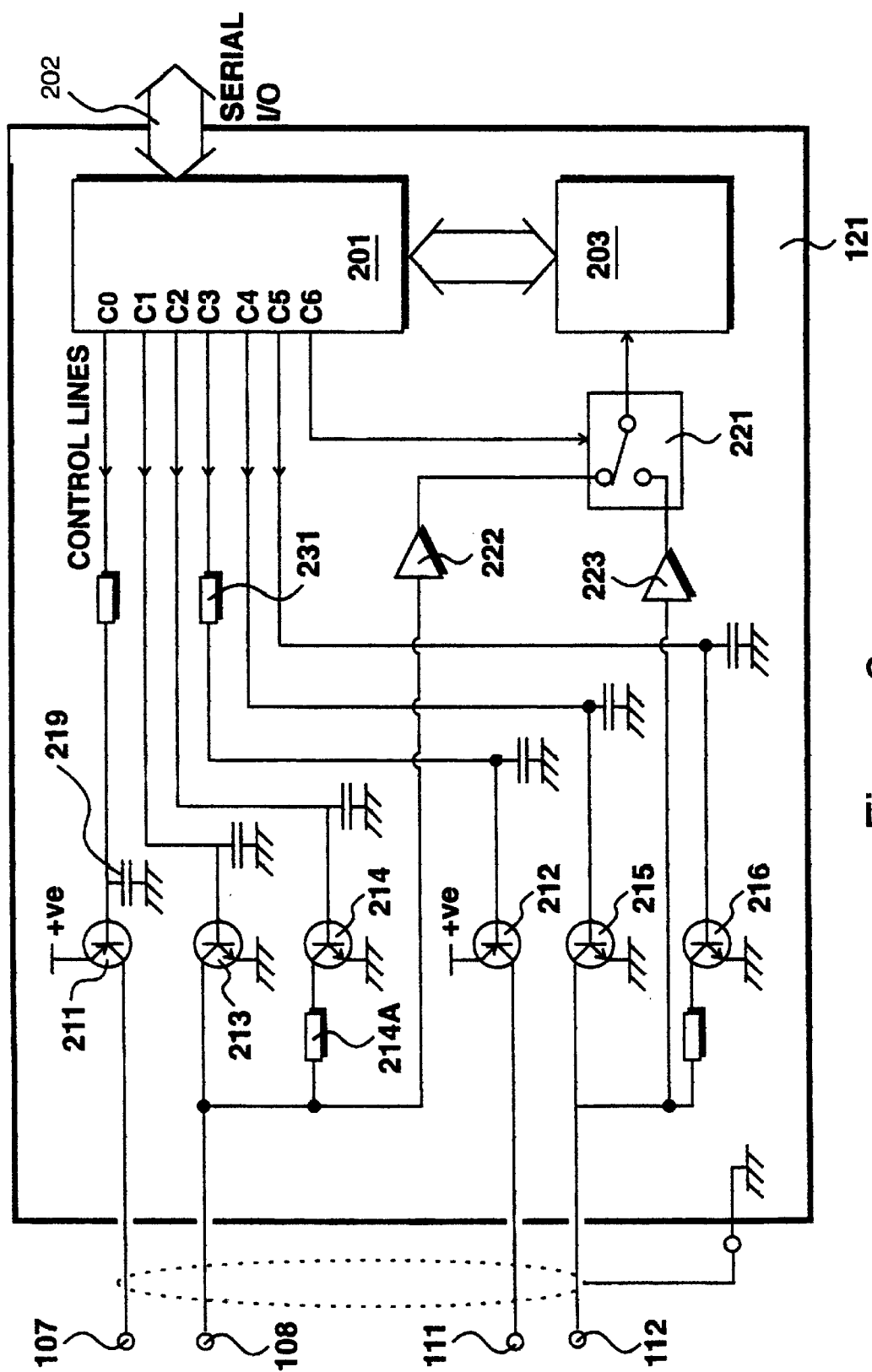
FIG. 2 shows the control circuit identified in FIG. 1.

The control circuit 121 is detailed in FIG. 2. The control circuit includes a micro-controller 201 such as a Philips 80C51 running at a clock frequency of twenty megahertz. Operations performed by micro-controller 201 are performed in response to internally stored commands held in an internal two kilobyte read-only memory. The micro-controller also includes one hundred and twenty-eight bytes of static RAM to facilitate intermediate storage while performing calculations and serial communications. The micro-controller 201 includes a serial interface 202 and an interface for communicating with an analogue to digital converter 203, arranged to convert input voltages into digital signals processable by the micro-controller 201. Seven pins from port 0 on the micro-controller are designated as outputs C0 to C6, and these are used to control the sensor interface circuitry.

The control circuit 121 includes two PNP transistors 211 and 212, in addition to four NPN transistors 213, 214, 215 and 216. All of the transistors are of relatively general purpose construction and control switching operations within the control circuit so as to control the application of voltages to the position detector 101.

In operation, a first measurement is made while a voltage is applied across the first plane 102. An additional measurement is made while a voltage is applied across the second plane 103. A voltage output only being applied to one of the planes at any particular time. When an output voltage is applied to one of the planes, plane 102 or plane 103, input signals are received from the opposite plane 103 or 102 respectively. Input signals are received by the analogue to digital converter 203 via a selection switch 221, implemented by a CMOS switch, in response to a control signal received from pin C6 of the micro-controller 201. Thus, in its orientation shown in FIG. 2, switch 221 has been placed in a condition to receive an output from a first high impedance buffer 222, buffering an input signal received from plane 102. Similarly, when switch 221 is placed in its alternative condition, an input is received from a second high impedance buffer 223, configured to receive an input signal from plane 103. By placing buffers 222 and 223 on the input side of CMOS switch 221, the switch is isolated from high voltage electrostatic discharges which may be generated in many conditions when the detector undergoes mechanical interactions.

In the condition shown in FIG. 2, switch 221 is placed in its upper condition, receiving input signals from buffer 222, with output signals being supplied to the second plane 103. Further operation will be described with respect to this mode of operation and it should be appreciated that the roles of the transistor circuitry are reversed when switch 221 is placed in its alternative condition. As previously stated, condition selection is determined by an output signal from pin C6 of micro-controller 201. In its present condition the output from pin C6 is low and switch 221 is placed in its alternate configuration when the output from pin 6 is high.

Output pin C0 controls the conductivity of transistor 211 with pins C1 to C5 having similar conductivity control upon transistors 212, 213, 214, 215 and 216 respectively.

Transistors 211 and 213 are switched on while a voltage is applied to the first plane 102. They are switched off while a voltage is applied to the second plane 103. Similarly, while a voltage is applied to the second plane 103, transistors 212 and 215 are switched on with transistors 211 and 213 switched off. In the configuration shown in FIG. 2, with switch 221 receiving an input from buffer 222, output transistors 211 and 213 are switched off, and output transistors 212 and 215 switched on. This is achieved by output pin C0 being placed in a high condition and pin C1 being placed in a low condition. Similarly, pin C3 is placed in a low condition and pin C4 is placed in a high condition.

In the configuration shown, C3 is placed in a low condition, as previously described. The micro-controller 201 includes a pull-down transistor arranged to sink current from the base of transistor 212, resulting in transistor 212 being switched to saturation conduction. Consequently, transistor 212 appears as having a very low resistance, thereby placing terminal 111 at the supply voltage of five volts. Resistor 231 (4K7) limits the flow of current out of the micro-controller 201, thereby preventing thermal destruction of the micro-controller's internal output transistor.

Pin C4 is placed in a high state, resulting in transistor 215 being placed in a conducting condition. A serial resistor is not required given that the micro-controller 201 includes internal pull-up resistors, as distinct from a pull-up transistor, such that current flow is automatically restricted. Thus, transistors 212 and 215 are both rendered conductive by driving them into saturation, resulting in terminal 111 being placed substantially at the positive supply rail voltage and terminal 112 being placed substantially at ground voltage. The capacitors shown in the circuit, such as capacitor 219, limit the rate of transistor switching transitions, thereby reducing radio frequency emissions from the sensor 101.

When transistors 212 and 215 are placed in their conductive condition, input signals are received from the first plane 102 in the form of a voltage at terminal 108. For position detection, this voltage is measured directly and transistor 214 is placed in a non-conductive condition by output pin C2 being placed in a low condition. Under these conditions, the voltage from input terminal 108 is applied to analogue to digital converter 203 via buffer 222 and switch 221.

The current flowing through the sensor in response to a mechanical interaction is then determined. The current measurement is made by placing transistor 214 in a conductive condition by placing output pin C2 in a high condition, and by placing output pin C4 in a low condition, hence switching transistor 215. In this condition, current received at terminal 108 is supplied to transistor 214 via resistor 214A, having a resistance of typically 5k, but selectable so as to correspond to the resistance characteristics of the sensor. A voltage is supplied to the A to D converter 203 via buffer 222 and switch 221. On this occasion, however, the voltage represents a voltage drop across resistor 214A.

Thus, transistors 212 and 215 are placed in a conducting condition, transistor 214 is placed in a non-conducting condition, so as to measure voltage, and is then placed in a conducting condition, with 215 in a non-conducting condition, so as to measure current. The roles of the transistors are then reversed, such that output transistors 211 and 213 are placed in a conducting condition, with transistors 212 and 215 being placed in a non-conducting condition, and switch 221 reversed, allowing a voltage to be measured by placing transistor 216 in a non-conducting condition, and then allowing a current to be measured by placing transistor 213 in a non-conducting condition, and transistor 216 in a conducting condition.

The cycling of line conditions, in order to make the measurements identified previously, is controlled by a timer circuit within micro-controller 201. After each condition has been set up, a twelve bit number is received from the digital to analogue converter 203 and this number is retained within a respective register within the micro-controller 201. Thus, after completing a cycle of four measurements, four twelve bit values are stored within the micro-controller 201 for interrogation by the processing device 131. Furthermore, the rate of cycling may be controlled in response to instructions received from the computer 132.

Figure 3:
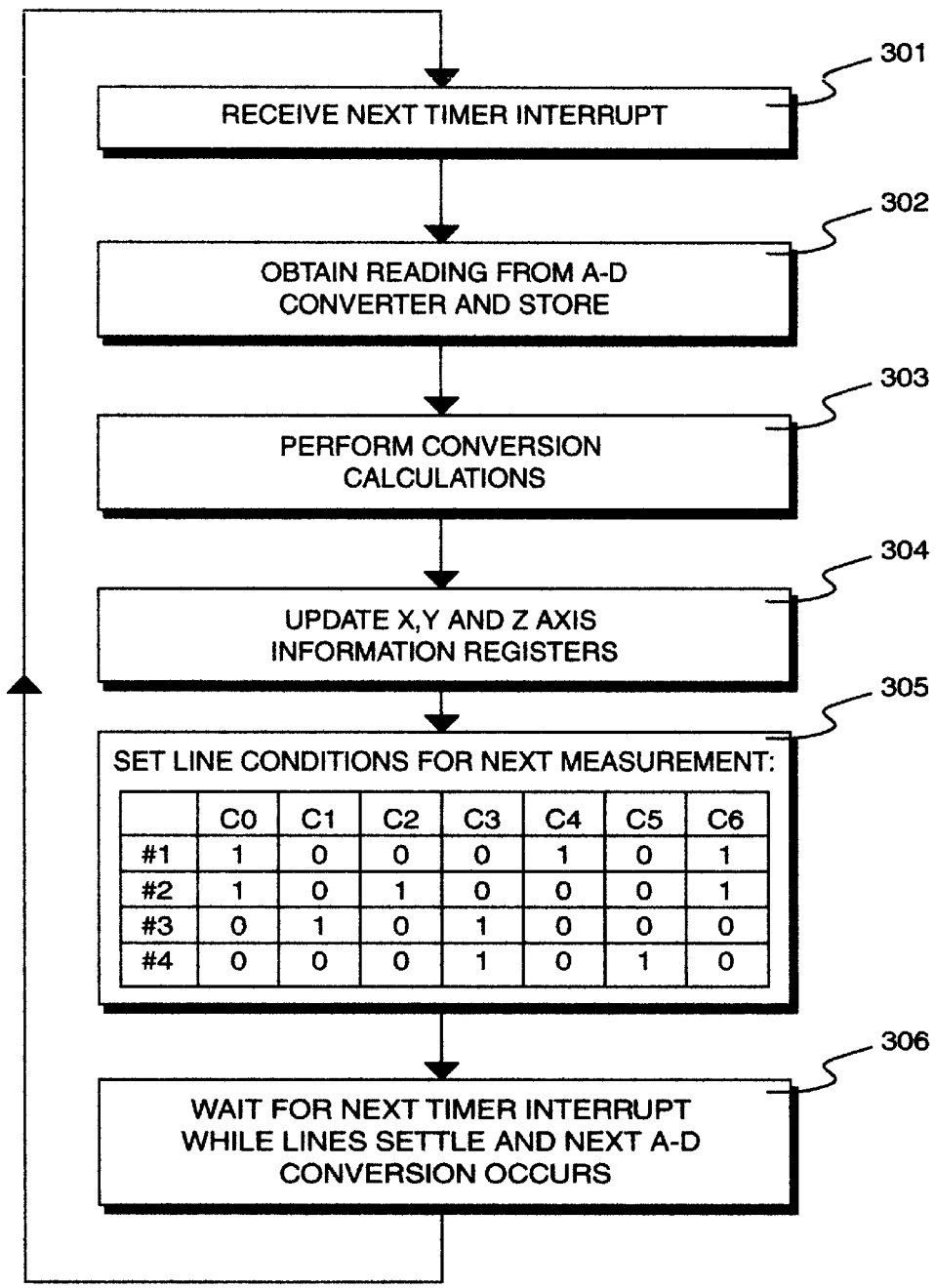
FIG. 3 details operations performed by the microcontroller identified in FIG. 2.

Operations performed by the micro-controller 201 are detailed in FIG. 3. The micro-controller continually cycles between its four configuration states and each time a new input is produced, representing a current or a voltage in one of the two configurations, new output data is calculated on an on-going basis. Thus, output registers are updated such that the best data is made available whenever the micro-controller is interrupted by the external processor 131.

The micro-controller 201 is fully interrupt driven. It can respond to interrupts for data interrogation, generated in response to receiving a serial data signal from the computer 132, and several other interrupt sources generated internally.

Internally, interrupts for the micro-controller 201 are generated by its own internal timer and the procedure shown in FIG. 3 is effectively held in a wait state until a next timer interrupt is received at step 301. The wait state allows voltage levels on connections 107, 108, 111 and 112 to become stable and provides sufficient time for valid data to be received from the analogue to digital converter 203.

At step 302, an output is received from the analogue to digital converter 203 and at step 303 calculations are performed with respect to the most current data received from the analogue to digital converter, so as to convert numerical values relating to voltages and currents into numerical values representing properties of the mechanical interaction. Thus, after performing calculations at step 303, appropriate registers are updated at step 304 and it is these registers that are usually interrogated in response to an interrupt received from processing system 131.

At step 305 the next conditions for the output lines are set by appropriate logic levels being established for output pins C0 to C6. After the next output condition has been selected, the processor enters a wait state at step 306, allowing the electrical conditions of the interface and the sensor circuitry to settle, whereafter processing continues in response to the next timer interrupt.

Thus, it should be appreciated that on each iteration of the procedure shown in FIG. 3, one of the output conditions is selected at step 305. The input data generated at step 302 is a measurement made in response to conditions of C0 to C6 that were set up during the previous cycle. The delay is made large enough to ensure that electrical characteristics have time to settle, and that A to D conversion may take place.

When output condition number one is selected, an output voltage at 108 is determined. On the next cycle, identified as output condition number two, the current flowing through connector 108 is determined. On the next iteration, under output configuration number three, the voltage appearing at connector 112 is determined and on the next cycle, identified as condition number four, the current flowing through connector 112 is determined. After each of these individual measurements, new data is generated in response to steps 303 and 304 such that resulting output registers are being regularly updated on a continual basis, such that the processing system 131 may effectively perform a continual monitoring operation in terms of changes made to the mechanical interactions with the detector 101.

In a typical implementation, the four characteristic measurements, making up a complete cycle, will be repeated at a frequency of between twenty-five to fifty times per second. In situations where such a repetition rate is not required, it may be preferable to increase the duration of the wait states and thereby significantly reduce overall power consumption. In some instances, when a measurement is made only a few times per second, it is possible to enter the micro-controller into a power-down mode, thereby reducing power dissipation and reducing consumption in a battery-operated environment. Alternatively, power consumption may be reduced by triggering an interrupt when a current flows across the fabric detector. This requires additional circuitry, not shown in FIG. 2.

Figure 4:
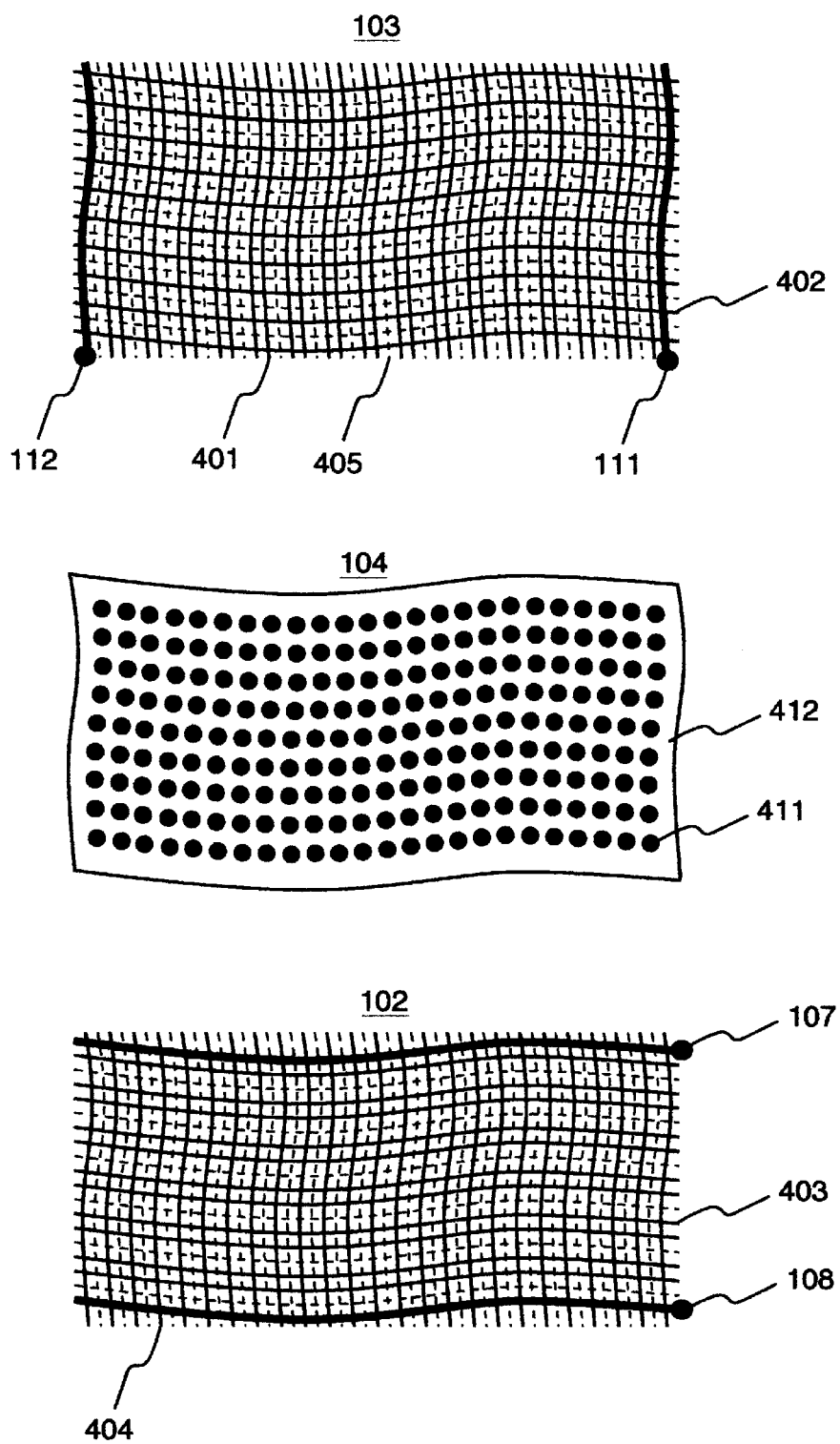
FIG. 4 details construction of the outer planes and central layer shown in FIG. 1.

Planes 102, 103 and 104 of the detector 101 are detailed in FIG. 4. Planes 102 and 103 are of substantially similar construction and are constructed from fabric having electrically conductive elements 401 and 402 in plane 103 along with similar electrical conductive elements 403 and 404 in plane 102. Relatively low resistance conductive elements 112 and 111 are incorporated in plane 103, and relatively low resistance conductive elements 107 and 108 are incorporated in plane 102. Thus, it is possible for a voltage indicative of position to be determined when conductive elements 402 are placed in electrical contact with conductive elements 404, via the central layer 104.

Horizontal and vertical directions are referred to as warp and weft in the context of woven fabrics. The overall resistivity in each of warp and weft directions of planes 102 and 103 are controlled by the inclusion of non-conducting elements 405. Thus, resistivity is controlled by setting the relative quantities and/or densities of conductive elements 401, 402, 403 and 404, with non conductive elements 405. Resistivity may also be controlled by selecting an appropriate fibre type, adjusting the thickness of the fiber or adjusting the number of sands present in a yarn.

A suitable fiber for conductive elements 401 402, 403 and 404 is "Resistat"® type F901, 22 denier carbon impregnated nylon 6, available from BASF and commonly used in static electricity dissipation applications. A suitable fiber for relatively low resistance conductive elements 107, 108, 111 and 112 is "Aracon"® type XNO400E-018 shielding grade nickel coated aramid fiber, available from DuPont and commonly used in electromagnetic shielding applications.

The low resistance conductive elements may be attached to, or incorporated into the fabric construction as part of the weaving process. Alternatively, they may be formed of a suitable conductive material, and achieved by printing, or by selective electroplating.

Central layer 104 is constructed from fabric or other deformable material having recessed electrically conductive elements 411 continuing through the thickness of the plane 104, together with a raised non conductive element 412. Conductive elements 411 are electrically isolated from each other in the x and y directions by the non-conductive element 412. The non-conductive element 412 may be formed from fabric having open spaces corresponding to conductive elements 411 with printed conductive material such as elastomeric conductive polymer forming conductive elements 411. The conductive material may be selected so as to have variable resistance according to applied pressure, or may be of a relatively incompressible material, therefore having a more stable resistivity.

As an alternative to recessing the conductive elements 411 in central layer 104, conductive elements 401, 402, 403 and 404 may be formed within planes 102 and 103, using fiber or yarn with a smaller diameter than the non-conducting elements 405. In this way, using certain configurations of fabric structure, conductive elements 401, 402, 403 and 404 are recessed below the surface contour of planes 102 and 103. Non-conducting elements 405 may also incorporate a readily deformable material such as neoprene fibers to facilitate a linear response to applied pressure.

When a potential is applied across one of the conducting planes, the actual potential detected at a point on that plane will be related to the position at which the measurement is made. Thus, a direct voltage measurement from the co-operating plane gives a value from which a positional co-ordinate may be determined. By reversing the plurality of the planes and taking a measurement from the opposing plane, two co-ordinates are obtained from which it is then possible to identify a precise location over the planar surface.

As previously described, the system is configured to measure currents in addition to measuring voltages.

When the two conducting planes are brought into electrical contact, due to a mechanical interaction, the amount of current flowing as a result of this contact will vary in dependence upon the actual position in the plane where the mechanical interaction takes place.

Figure 5A:
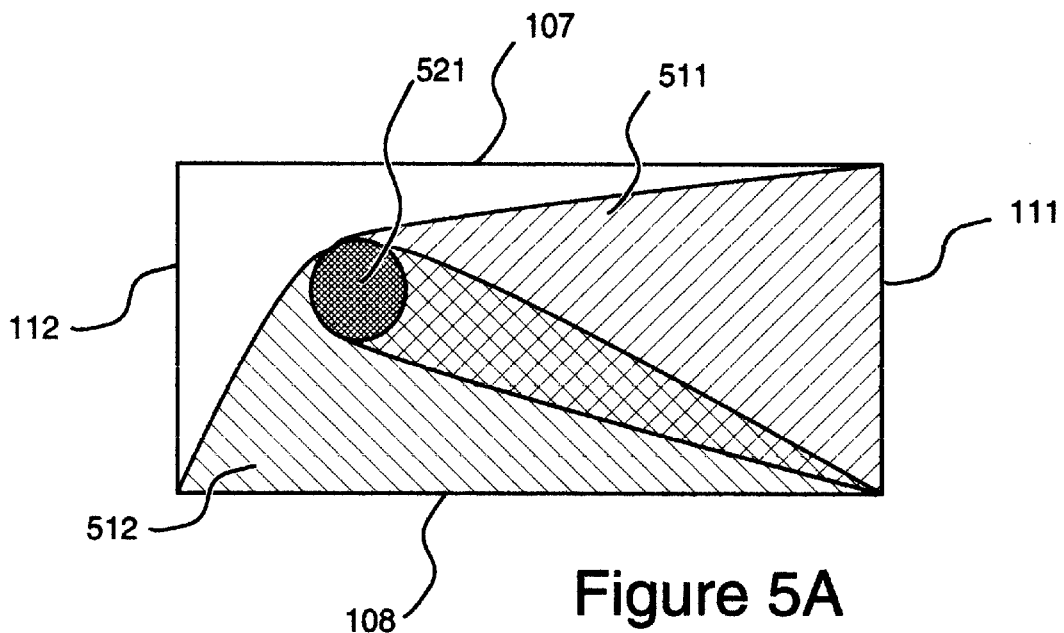
FIG. 5A details current flow in the sensor shown in FIG. 4, in a first mode of measurement.

FIG. 5A illustrates the current flow within detector 101 at step #2 of the measurement cycle shown at 305 in FIG. 3. The amount of current flowing due to a mechanical interaction will depend upon the position of a mechanical interaction 521. However, in addition to this, the amount of current flow will also depend upon the size of the mechanical interaction. As the size of the mechanical interaction increases, there is a greater area of contact and as such the overall resistance of the mechanical interaction is reduced. However, it should be appreciated that variations in terms of current with respect to interaction size is a sophisticated relationship, given that, in addition to the resistivity of the contact area 521, the resistivity of the actual electrical connections within the sheet must also be taken into account.

Thus, current supplied to the low resistance element 111 is transmitted across plane 103 through a region 511 in order to provide a current to the contact region 521. Similarly, current is transmitted across plane 102 from the contact region 521 to low resistance element 108. Thus, the total electrical resistance between 111 and 108 is composed of the sum of the resistance of regions 511, 512 and the contact region 521, with the resistance of 511 and 512 being variable, according to the position of the mechanical interaction. The resistance of contact region 521 is variable according to area of contact and the applied force.

Figure 5B:
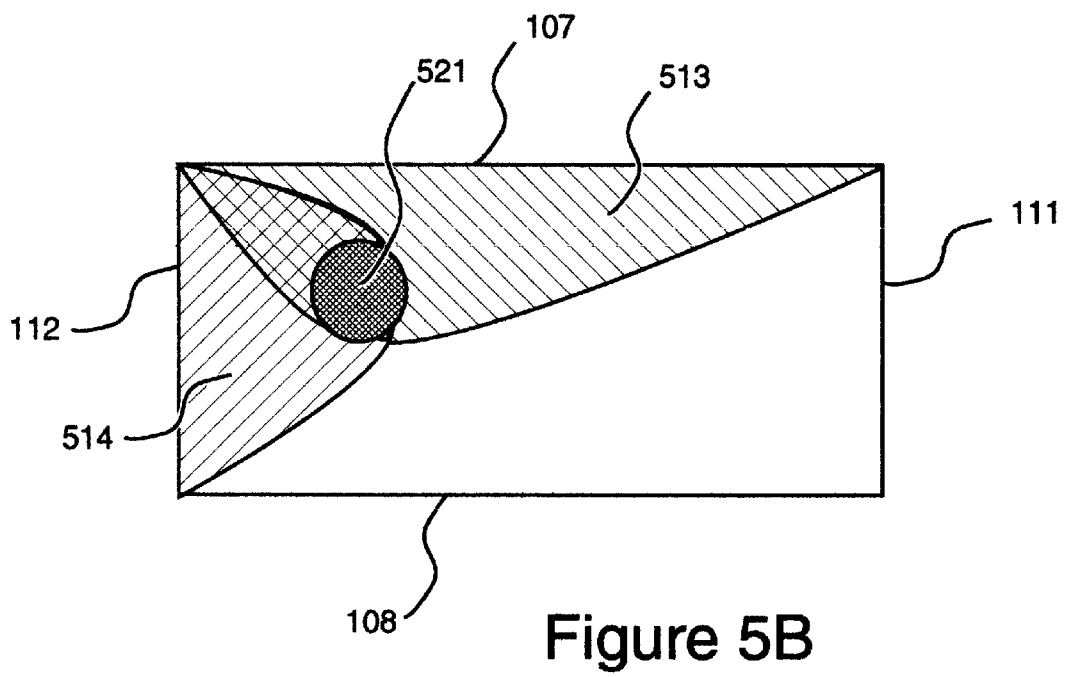
FIG. 5B details current flow in the sensor shown in FIG. 4, in a second mode of measurement.

Similarly, FIG. 5B illustrates the current flow within detector 101 at step #2 of the measurement cycle shown at 305 in FIG. 3.

Current supplied to the low resistance element 107 is transmitted across plane 102 through a region 513 in order to provide a current through the contact region 521. Similarly, current is transmitted across plane 103 from the contact region 521 to low resistance element 112. The total electrical resistance between 107 and 112 is composed of the sum of the resistance of regions 513, 514 and the contact region 521, with the resistance of 513 and 514 being variable, according to the position of the mechanical interaction.

For a given area of mechanical interaction the resistance of 511 plus the resistance of 614 will be approximately constant, regardless of the x position of the mechanical interaction. The value of the constant is related to the sheet resistance of the planes 102 and 103, and to the area of the mechanical interaction. Similarly, for a given area of mechanical interaction, the resistance of 512 plus the resistance of 513 will be approximately constant, regardless of the y position of the mechanical interaction. Thus, by using two measurements as previously described, a reading approximately proportional to the resistance of the contact region 521 can be derived which will not vary significantly in relation to variations in x and y position of the mechanical interaction.

A further advantageous characteristic is obtained for a position sensor, when the resistivity of the outer planes 102 and 103 is anisotropic, that is to say, dependent upon the direction of current flow. For greatest accuracy current is able to flow easily in the direction perpendicular to the voltage gradient, but less easily in the direction of the voltage gradient. Again, this reduces the paths for current flow which interfere with the process of pressure and area measurement, that are derived from measurements of current flow. However, since conductive fiber is relatively costly compared with non-conductive fiber, in practice, for many applications, a small amount of accuracy in the measurement of current may be sacrificed in the interest of low cost, by reducing the relative conductivity in the direction perpendicular to current flow.

An arrangement for anisotropic conductivity is shown in FIG. 4. Outer layer 103 includes conductive fibers 402 that conduct in the direction of the current flowing from connector 111 to connector 112. Cross threads 401 conduct in a direction perpendicular to this one, and have the effect of ensuring a linear voltage gradient across the sheet, even when variations in connections between lateral fibres 402 with the conductors 111 and 112 are variable, as would be expected in a manufacturing process. Insulating fibers 405 are used between the conductive fibers 402 and 401. Anisotropic conductivity is achieved, in the present embodiment, by selecting a different ratio of conductive fibers 401 and 402 to non-conductive fibers 405 for each of the warp and weft directions. Thus, in the direction of current flow, which is horizontal in the drawing of plane 103 shown in FIG. 4, an insulating fiber alternates with a conducting fiber 402. There is an equal quantity of both. However, in the perpendicular direction, there are two conducting fibers 401 for each insulating fiber 405. Thus, in the direction perpendicular to applied current flow, or the direction perpendicular to the voltage gradient, conductivity is increased. This has advantages in reducing undesirable current flow when pressure is applied to an area of the sensor, thus facilitating greater accuracy of measurements.

A similar arrangement is shown for outer plane 102, also shown in FIG. 4, with the dimensions rotated by ninety degrees for this plane. By obtaining anisotropic characteristics for both outer planes, overall characteristics are improved. Anisotropic conductivity of the outer planes 102 and 103 is further combined with a relatively high resistivity of the central layer 104, to obtain the most ideal characteristics.

An advantageous characteristic is obtained for current measurement when the resistance across the thickness of the central layer 104 is significantly higher than the sheet resistance of either of the outer planes 102 and 103. This advantage arises from the fact that conduction in the central layer is reduced, compared to conduction in the outer planes 102 and 103, and thereby minimising area and or pressure measurement distortions due to variations in x and y position.

Figure 6:
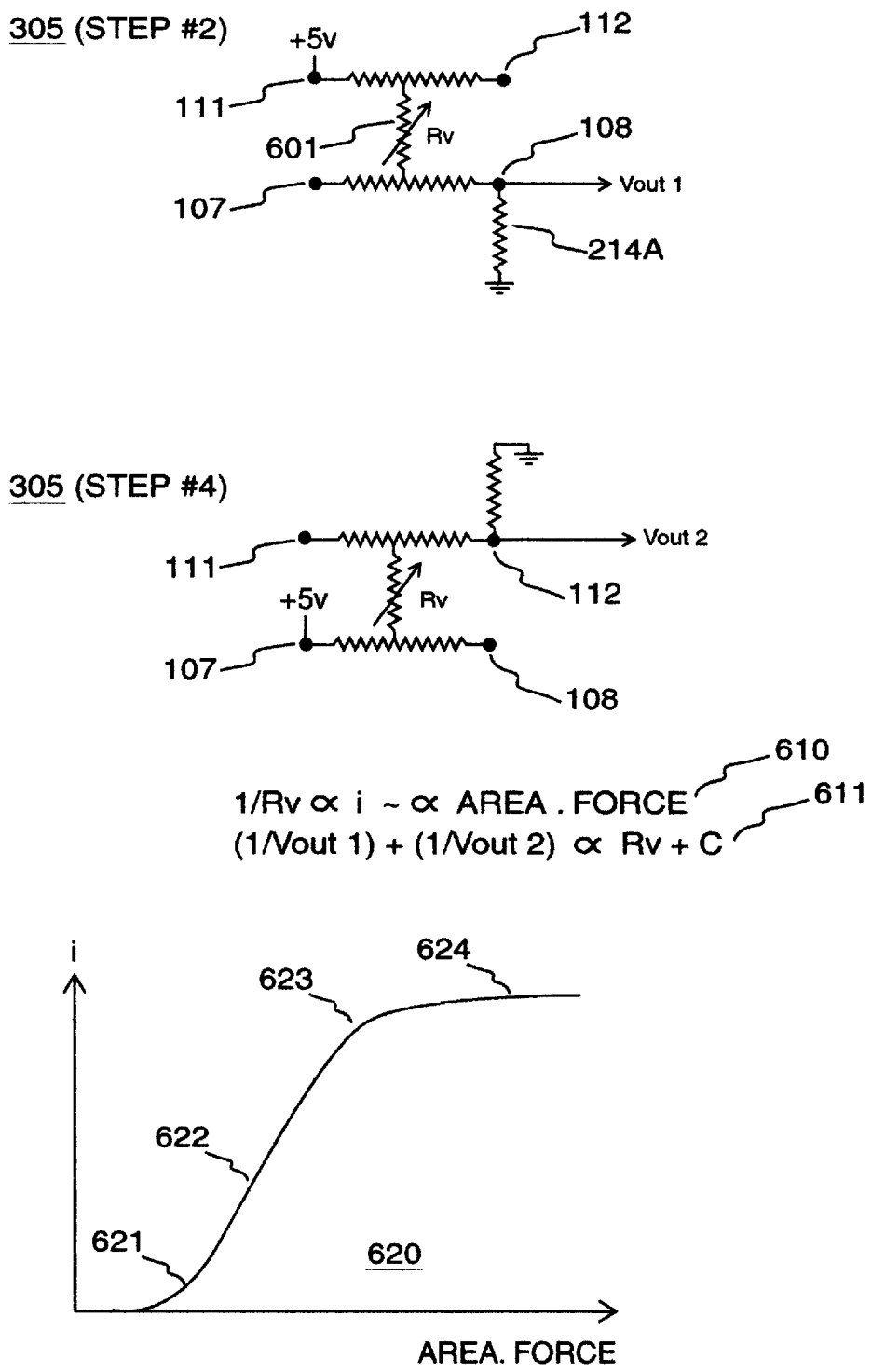
FIG. 6 details a schematic representation of current flowing in the sensor arrangement shown in FIG. 1, in response to signals issued by the circuit shown in FIG. 2.

The current flow is further illustrated in FIG. 6. Where the resistance of the contact region 521 is represented by variable resistor 601. Since the resistivity of the planes 102 and 103 is approximately constant, a value approximately proportional to Rv, the variable resistance 601, can be obtained using the relationship illustrated at 611, where Vout1 is the value obtained by the Analogue to Digital converter in interface 121 at step #2 of the measurement cycle, Vout2 is the value obtained at step #4, and C is related to the resistivity of the fabric planes 102 and 103. In addition C varies with the area of the contact region 521.

Thus, for certain constructions of fabric planes 102 and 103, since the combined resistance of 511, 512, 513 and 514 are roughly constant, with small variations in relation to variations in the area of the mechanical interaction, the value obtained at 611 may be taken to be roughly inversely proportional to the current flowing through Rv, representing the contact region 521, and will not very significantly with variation of the position of the mechanical interaction.

The relationships identified at 610 and 611 provide a means for obtaining a value related to the product of force with area. The graph at 620 indicates practical measurements of current i, obtained when an increasing force is applied to a constant area of the sensor 101. At low levels of applied force, no current flows. At 621 a threshold region is entered, at which the relationship between current and applied force may be non-linear. Thereafter, at 622, a substantially linear relationship is observed. At 623, a force has been reached at the limit of the compressibility of the central layer 104, such that substantial additional force does not result in a corresponding increase in current flow, as illustrated by the substantially flat region of the graph at 624. A graph of this type may be observed for a wide variety of sensor materials and constructions. However, the gradient 622 and the locations of the non-linear transition regions, and their relative magnitudes, will vary widely, depending on the precise construction of the sensor, and in particular, the construction of the central partially conductive layer 104.

Figure 7:
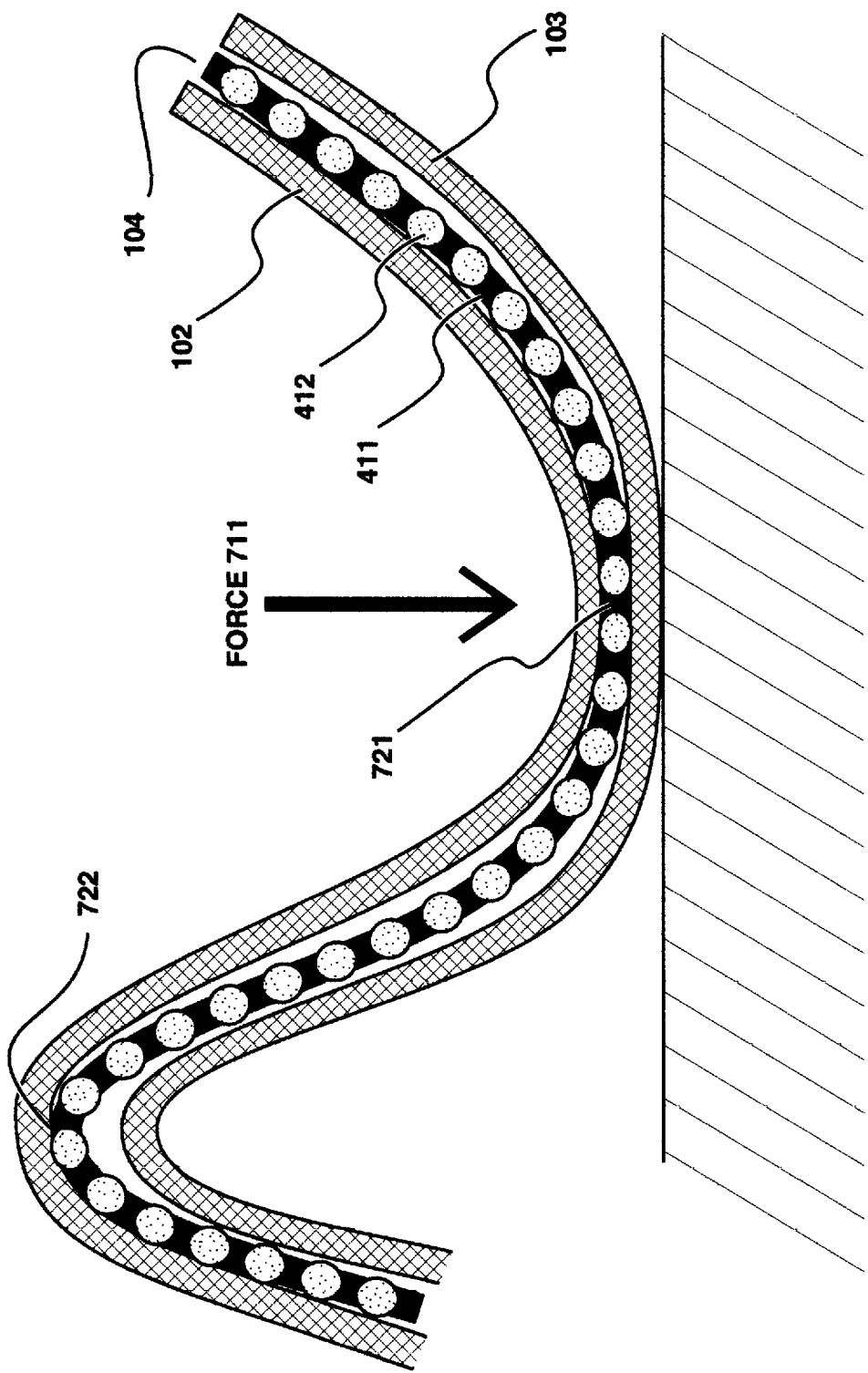
FIG. 7 details a cross sectional view of the type of sensor shown in FIG. 4 under conditions of folding, creasing and deliberate applied force.

FIG. 7 details an aspect of the present invention that has not been hitherto described, and which affects the ability to use the sensor in conditions where folding of the sensor is likely to occur during its use, or as a result of the shape around which it may be formed. The central partially conductive layer 104 facilitates conduction in such a way that folding is unlikely to result in false conduction at a point where external pressure is not being locally applied. In FIG. 7, a force 711 is applied locally to the sensor 101. The sensor is folded, and at places where a fold occurs, such as 722, the central layer 104 tends to make contact with either the upper plane 102 or the lower plane 103, and not with both planes simultaneously. The central layer 104, does not conduct in the x or y dimensions, and therefore does not allow a connection made at 722 to interfere electrically with connections made at 721. Furthermore, folds resulting in connection between the central layer 104 and either of the outer planes 102 or 103, do not result in conduction across the layers. Furthermore, an applied force 711 may be detected with the same accuracy as would be the case if the sensor was completely flat.

Thus, the central layer 104, being partially conductive, facilitates folding of a fabric based sensor without reduction in accuracy of electrical sensing of a mechanical interaction, and without unwanted outputs related to internal pressures applied resulting from folding or creasing. Preferably the central layer 104 does not significantly conduct across its plane, but conducts significantly in a direction perpendicular to its planarity, when a force is applied to it.

Figure 8:
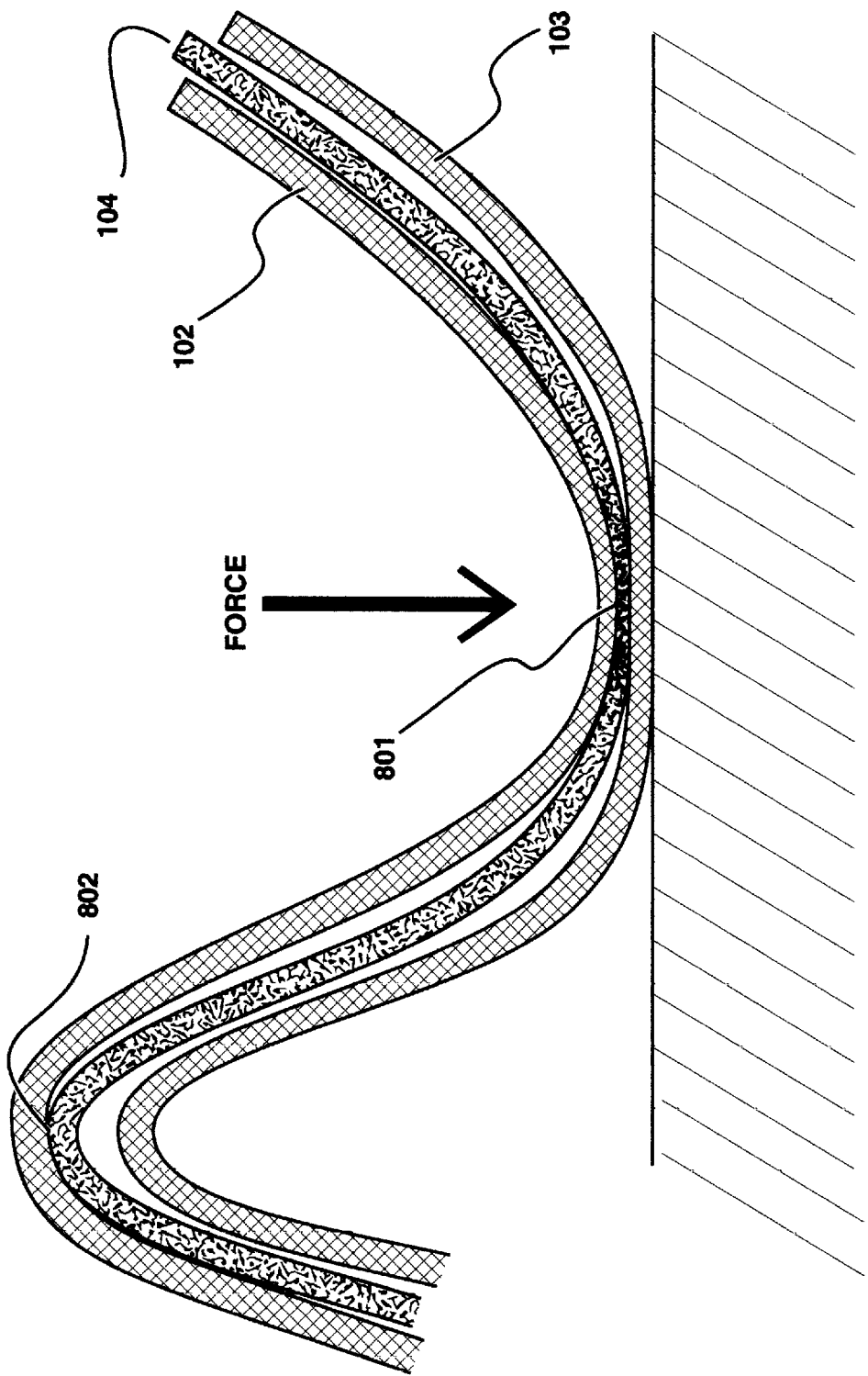
FIG. 8 details a cross sectional view of an alternative sensor construction under conditions of folding, creasing and deliberate applied force.

A further embodiment of the present invention is illustrated at FIG. 8. In FIG. 8 the sensor 101 has a modified construction, wherein the central layer 104 is constructed in a manner different to that shown in FIG. 4. In this embodiment, the central layer 104 comprises a substantially compressible partially conductive medium, such that changes in applied force result in a larger linear region 622 of the output response, than that which results from use of the sensor detailed in FIG. 4. The highly compressible medium consists of a foam or compressible knitted or felted fabric having a substrate that is comprised of an insulating material. Within the insulting structure so formed, conductive particles or short filaments are interspersed at regular or random intervals, depending upon the mode of manufacture. Preferably, when no pressure is applied, filaments do not connect with each other, and so no electrical conductivity is observed in any dimension. As force is applied, however, the structure distorts such that filaments are brought closer together, such that, on average, a certain proportion of filaments connect. The number of connections increases, as the structure is distorted under pressure, as the distance between adjacent filaments is reduced still further. A point is reached at which the medium cannot be compressed further, marking the region from 623 to 624 shown in the graph in FIG. 6. Connections between filaments are made in the area of the applied force, so that conduction in other areas outside from the region of the applied force remains at zero.

Furthermore, in addition to desirable electrical qualities, a highly compressible medium provides valuable aesthetic qualities in terms of the touch and feel of the sensor as it is being operated.

The highly compressible central layer 104 shown in FIG. 8 results in a detector that is highly linear to the measurement of either applied force over constant area, or area of applied constant pressure. The previous sensor detailed in FIG. 4 is less responsive to variations in force, and can be constructed in such a way that there is very little compressibility or variation in conduction in response to applied pressure. This can be achieved by making each of the conductive regions 411 out of a substantially incompressible material, such as a substantially rigid conductive plastic. With such an arrangement, connection between the outer planes 102 and 103 is substantially on or off, with regard to each individual conductive region 411.

Figure 9:
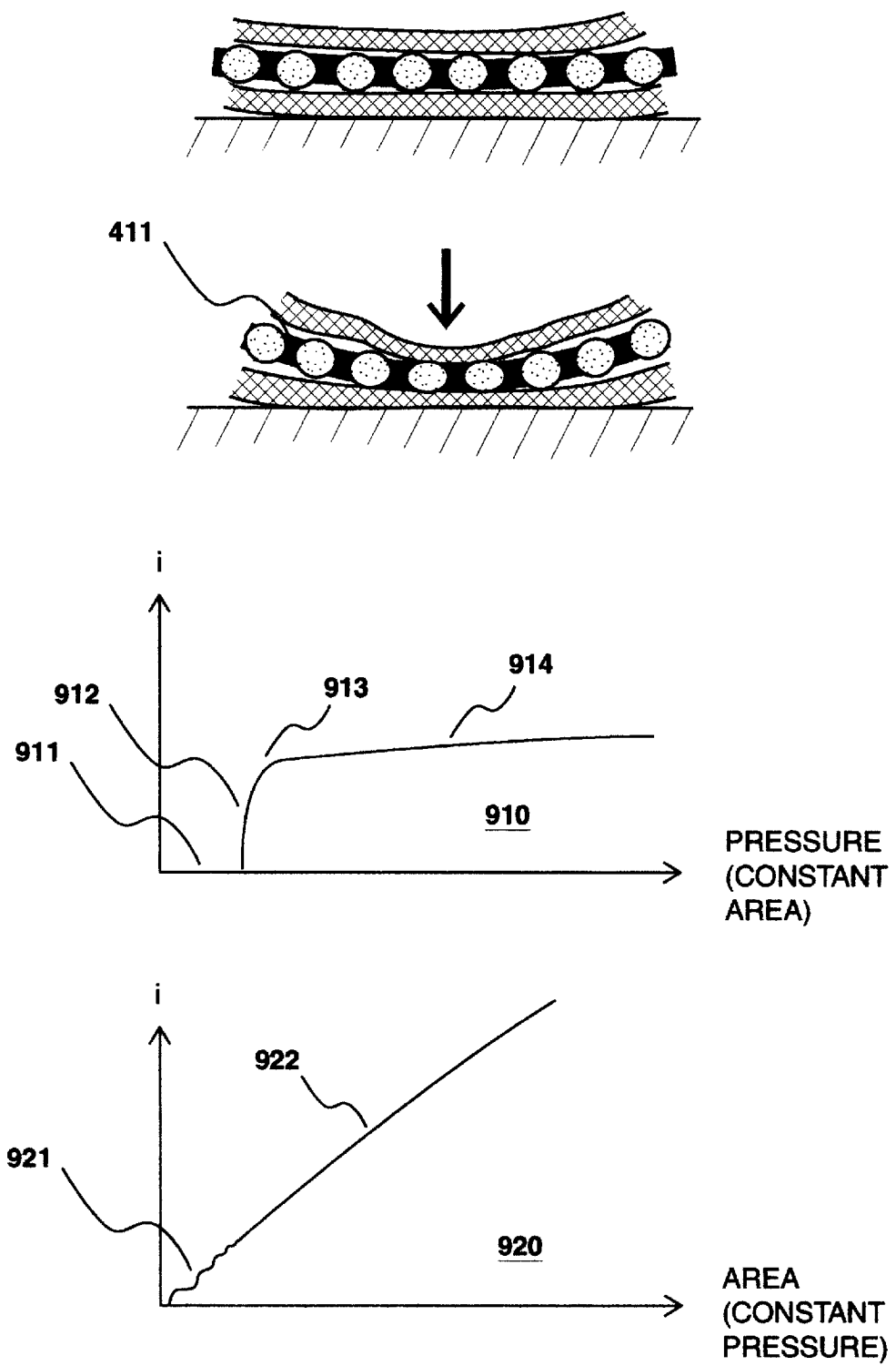
FIG. 9 illustrates physical and electrical characteristics of the sensor shown in FIG. 7.

This type of arrangement is illustrated in FIG. 9. At graph 910, a highly non-linear transition between an off state 911 and an on state 913 is observed. There is still a non-vertical gradient 912, but this is extremely short. Increased applied pressure mostly results in negligible increase in current flow, as indicated at 914. At graph 920, a highly linear variation 922 results in the area of an applied force being changed. Substantially the same relationship is observable even with a substantial variation in applied force. Typically, as the area of an applied force increases, the pressure reduces if the same force is applied over a wider area. Usually, there is a variation over time. With this sensor, only variations in the area makes a substantial difference to the current that is flowing, provided that the force applied uniquely to each individual conductive element 411, is great enough for local conduction to enter the saturated region 914. For a very small area, where only two or three conductive elements are receiving significant pressure, there will be a non-linear variation until area is increased to include more conductive elements. This is represented by the non-linearity shown at 921. As more and more elements are introduced, this non-linearity becomes trivial. This source of inaccuracy can be reduced to tolerable levels by selecting a suitably small size of conductive element 411.

Figure 10:
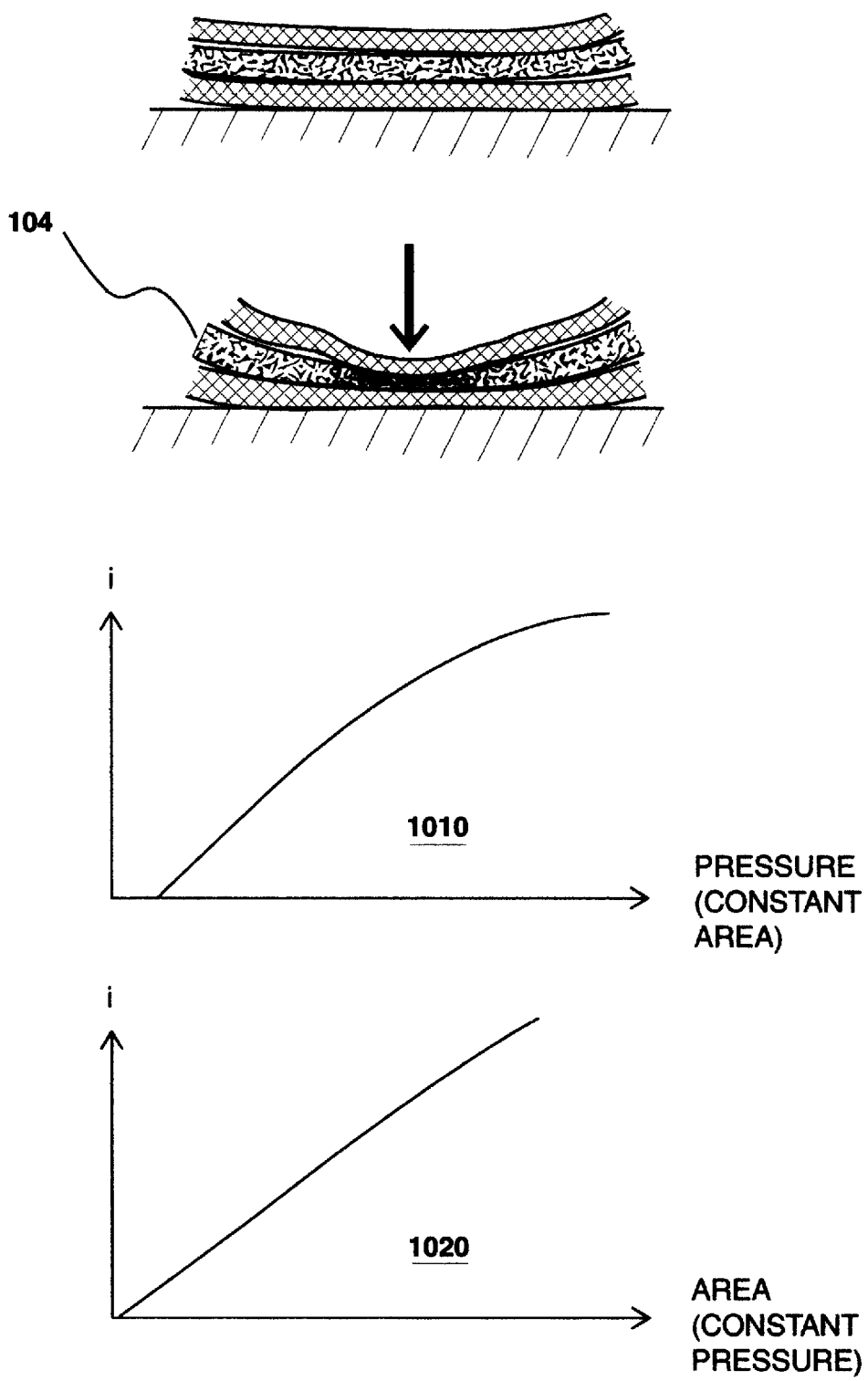
FIG. 10 illustrates physical and electrical characteristics of the sensor shown in FIG. 8.

The relationships for the sensor constructed using the highly compressible central layer shown in FIG. 8 are detailed in FIG. 10. At graph 1010 a substantially linear relationship is exhibited for pressure applied over a constant area. At graph 1020, a linear relationship is also exhibited. Unlike graph 920 in FIG. 9, however, graph 1020 is for area with a constant applied pressure. If pressure changes, so does the current.

Figure 11:
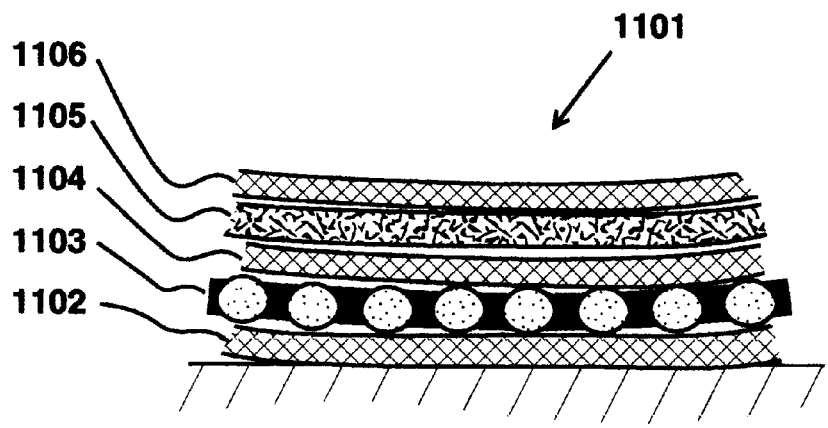
FIG. 11 illustrates physical and electrical characteristics of a composite sensor comprising the sensors shown in FIGS. 7 and 8.
Figure 11:
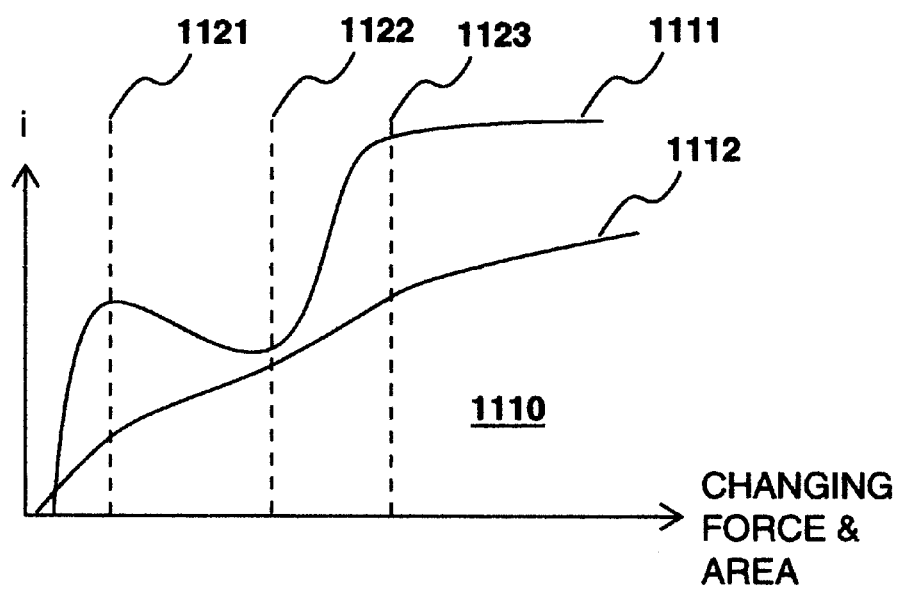

A sensor and method for detecting force and area separately are illustrated in FIG. 11, A sensor 1101 has a multi-layer construction. In effect, two sensors are combined. A first, comprising the arrangement shown in FIG. 4 using substantially incompressible elements 411, and a second utilising the highly compressible central layer indicated in FIG. 8. A lower outer plane 1102 makes partial physical contact with a first central layer 1103, constructed in accordance with the central layer shown in FIGS. 4 and 7. The first central layer 1103 makes partial physical contact with a plane 1104. A compressible medium 1105 forms the next layer, and an outer plane 1106 forms the final stage of the construction. Electrical signals may be applied to layers 1102, 1104 and 1106, in order to detect the effect of mechanical interactions with the partially conductive layers 1103 and 1105. The direction of conductivity across planes 1102 and 1106 is parallel. Conductivity across plane 1104 is perpendicular to that of planes 1102 and 1106. Using this construction, the characteristics of the two detectors are combined. From a first set of characteristics, detailed in FIG. 9, an area of applied pressure may be determined. A second set of characteristics, detailed in FIG. 10, determines a value proportional to the product of force and area. The applied force may then be determined by dividing the second set of characteristics by the first, or a second reading by a first reading. Readings related to force and area are thereby obtained independently, thus also allowing a calculation for pressure, being force divided by area, to be made along with x and y co-ordinates obtained as described previously. In FIG. 11, a composite graph 1110 shows the combined response of the two sensors. A first curve 1111 indicates the response of the sensor comprising layers 1104, 1105 and 1106. A second curve 1112 indicates the response of the sensor comprising layers 1102, 1103 and 1104.

Depending on the process of manufacture, it may be possible to obtain a compressible central layer with the lateral insulating characteristics that have been described. However, it may also be advantageous to use a cheaper form of manufacture, in which case desirable characteristics may still be obtained, but with a reduction of insulating characteristics laterally across the plane of the central layer 104, thus resulting in a possible slight loss of accuracy when the sensor is folded.

Errors in readings due to creasing and folding may be reduced using a central layer of high lateral sheet resistivity.

Figure 12:
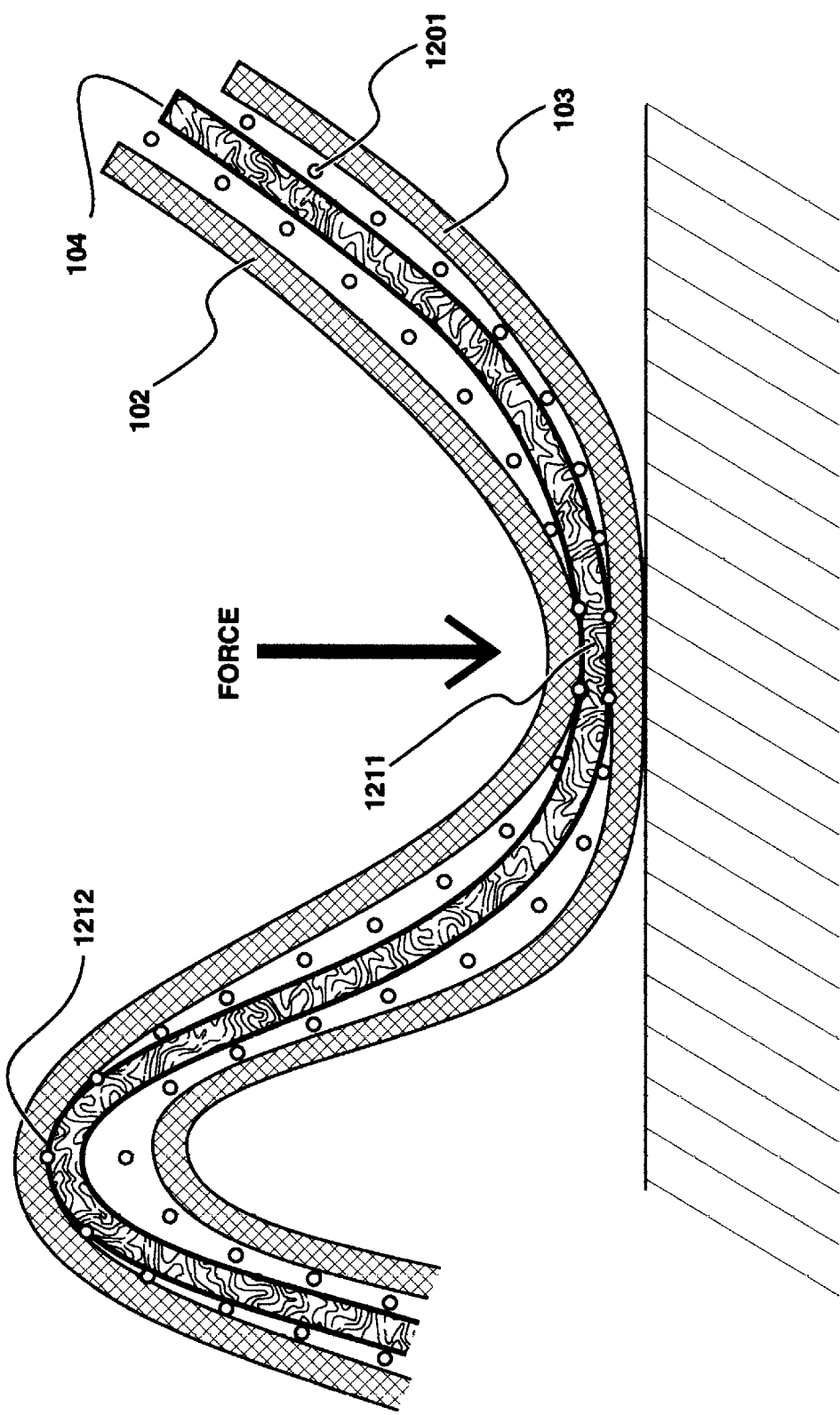
FIG. 12 details a cross sectional view of an further alternative sensor construction under conditions of folding, creasing and deliberate applied force.

As explained earlier, it is possible to construct a central layer having a lateral insulating characteristic, as shown in FIG. 4, using only small local conductive elements 411. Alternatively, lateral insulation may be achieved using the compressible medium also described previously. As a further alternative, a structure processing very high sheet resistivity may be used, having a lower resistance across its thickness than laterally. In FIG. 12, this reduction in accuracy is minimised by additional insulating means 1201. This is provided between the outer planes 102 and 103 and the central layer 104. The additional insulating means may be a separate layer in itself, such as an insulating mesh or weave. Alternatively, the recessing of the conductive inner surface of the outer planes 102 and 103, or of the central layer 104, may be achieved by a process of combining conductive fibers of a smaller diameter with non-conductive fibers having a greater diameter. Using this type of arrangement, the requirement that the central layer 104 should be laterally insulating is reduced, and so the cost of manufacture may be reduced.

Figure 13:
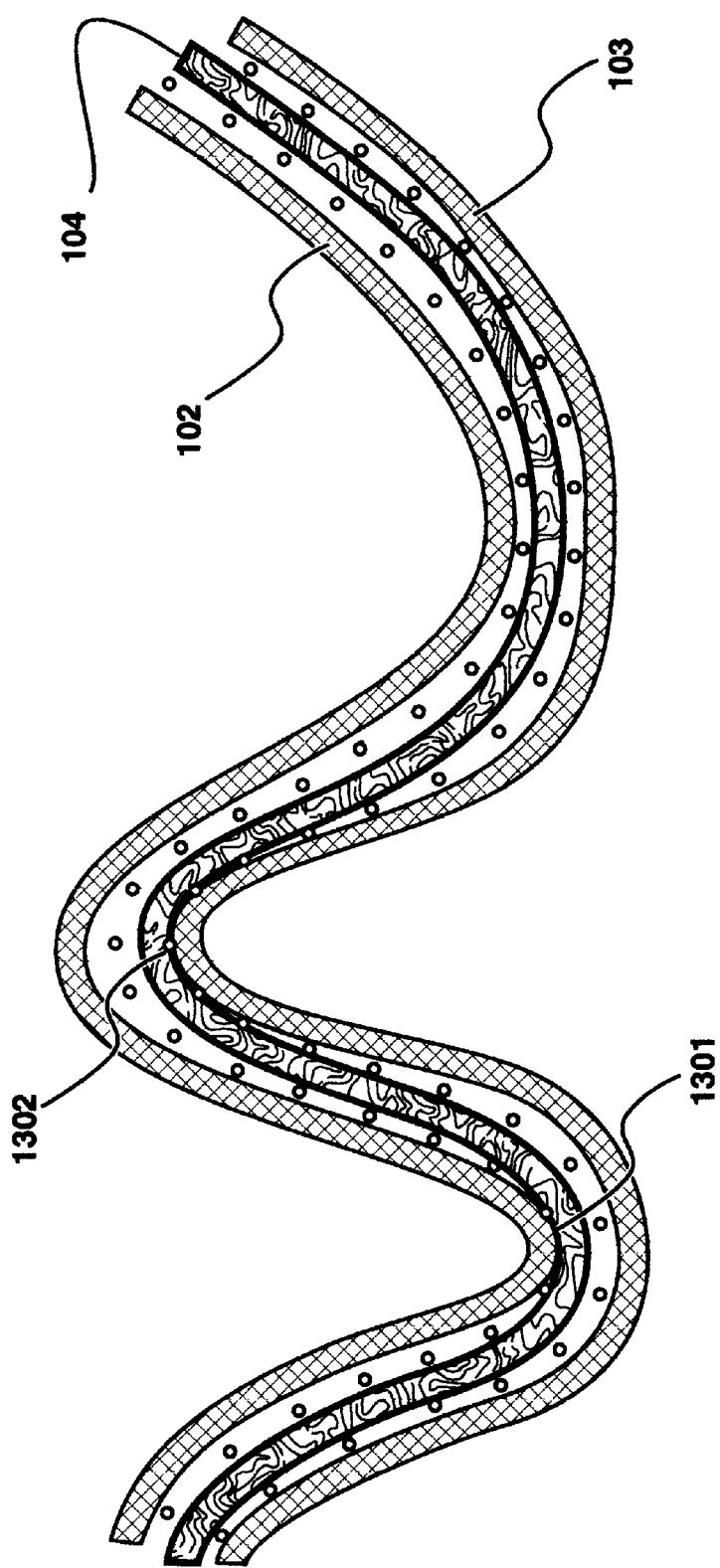
FIG. 13 details a cross sectional view of a further alternative sensor construction under conditions of folding, creasing but without deliberate applied force.

FIG. 12 shows that conduction between a connection resulting from folding at 1212, does not interfere with the force applied at 1211, due to the presence of insulating means 1201. Furthermore, other folding elsewhere does not interfere with detection of mechanical interaction, due to the fact that, at no point due to folding, is a connection made between the central layer and both the outer layers 102 and 103 in the same region. In FIG. 13, for example, multiple folds and creasing are observed. A particularly deep crease is seen at 1301, where the central layer makes electrical contact with the outer plane 102. However, at the same point 1301. the lower plane 103 is insulated from the central layer by the insulating means.

At location 1301, the insulating means prevents a large area of electrical contact between the inner layer 104 and the lower outer plane 103. Thus, although lateral conduction between the creases at locations 1301 and 1302 may occur in the central layer itself, the presence of the insulator at 1302 and elsewhere, prevents simultaneous contact with both of the outer planes in any given region. In this way, provided that the lateral conductivity of the central layer 104 is sufficiently high, the lateral conductivity of the central layer does not significantly interfere with signals generated as a result of a deliberate mechanical interaction, such as that indicated at 1211 in FIG. 12. FIG. 13 shows that, for a sensor using a laterally conductive central layer 104, current may flow between upper and lower conductive layers 102 and 103 as a result of creasing and folding alone. However, provided the lateral resistivity or sheet resistance of 104 is high, this current may be negligible for many applications, and there may be cost advantages in the use of such a structure.

The structure of the position sensor as described makes possible construction of a flexible sensor from fabric, including the possibility that the sensor may be folded and creased in the way that is to be generally expected of fabrics.

Figure 14:
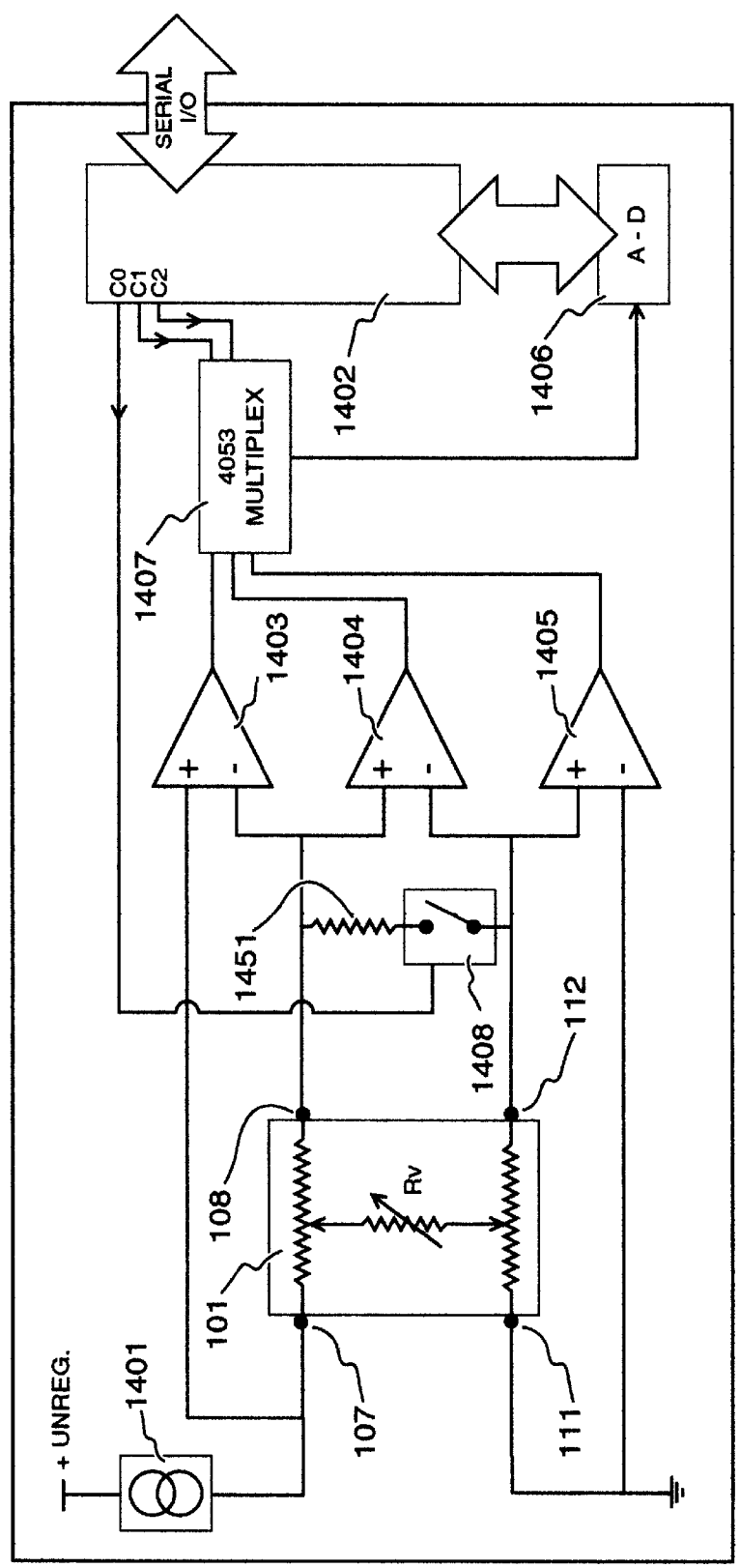
FIG. 14 shows an improved control circuit of the type shown in FIG. 1.

As an alternative to the circuit shown in FIG. 2, interface circuitry shown in FIG. 14 is provided to enhance the performance of a fabric sensor of the type tat has been described. Furthermore, additional calibration circuitry may be included in order to compensate for change in resistance due to stretching, humidity or temperature.

In FIG. 14. a constant current source 1401 supplies a substantially constant current to the fabric-based position sensor 101 via a first connection 107. Additional connections are made to the sensor using the connections shown in FIG. 1, which are the other connection 108 to the upper plane 102, and the two connections 111 and 112 to lower plane 103. Connection between outer planes 102 and 103 via the central layer 104 may be considered as forming a variable resistor when a force is applied.

A first differential amplifier 1403 measures the voltage between the connections 107 and 108 of the upper plane 102. A second differential amplifier 1404 measures the voltage across connections 108 and 112, and a third differential amplifier measures the voltage across the connections 112 and 111. Terminal 111 is connected to ground, and provides a current sink for the current source 1401, when enough pressure is applied to the sensor to enable current to flow from the upper plane 102 to the lower plane 103 via the central layer 104.

In operation, when a current is flowing through the sensor 101, a voltage drop exists across the top plane 102, in the direction from connector 107, towards the region of the applied force. Current then flows through the central layer 104 in the region of the applied force. Thus, the remainder of the top plane 102 does not sustain any voltage drop, and the potential at the region of mechanical interaction is measurable at terminal 108. The voltage measured between terminals 107 and 108 therefore gives an indication of the position across the top plane 102 of the region of mechanical interaction.

A similar effect operates in the lower plane 103. Conduction of current from the region of mechanical interaction to terminal 111 results in a voltage being developed across this region. As no current is conducted from the region of mechanical interaction to connector 112, the potential at connection 112 is the same as that developed at the region of mechanical interaction. The voltage measured between connections 111 and 112 provides an indication of the location of the region of mechanical interaction across the lower plane 103, in a direction perpendicular to that indicated by the voltage between connections 107 and 108.

Furthermore, the potential developed across the variable resistance that results from a force being applied to a region of the sensor is measurable between connections 108 and 112, and this voltage reduces as the electrical resistance of the region under pressure is reduced.

The arrangement shown in FIG. 14 facilitates continuous measurements to be made of both x and y position, along with a measure of the voltage developed across the central layer 104. The voltage across the central layer may be used to determine pressure and or area of the region of mechanical interaction, using techniques previously described in relation to current measurement. However, in the case of the circuit shown in FIG. 14, the same calculations are performed with respect to a voltage, while the current is constant. In the previous descriptions of pressure and or area measurement, it is assumed that voltage is maintained as a constant (or determined and then factored out of the equations), and that current was the characteristic that varied. Either form may be used, with minor adjustments to the equations required in order to determine the actual physical characteristics of the mechanical interaction.

The differential amplifiers 1403, 1404 and 1405 provide amplification and high impedance buffering for the three voltage measurements that are made across the sensor. The outputs from these three amplifiers are supplied to an analogue multiplexer circuit 1407. The multiplexer selects one of the three voltages to be supplied to an analogue to digital (A-D) converter 1406. The output of the analogue to digital converter 1406 is a twelve bit binary value providing an indication of the voltage that has been measured. This is supplied to a micro-controller 1402.

The sequence executed by the micro-controller is substantially similar to that identified for the voltage measuring circuit shown in FIG. 2 and detailed in FIG. 3. At step 301, the micro-controller enters a wag state, possibly enabling a reduced power consumption. At step 302 a reading is obtained from the A-D converter 1406, and this is stored in registers inside the micro-controller. At step 303 conversion calculations are performed, and at step 304 information registers are updated as a result of calculations performed at step 303.

For the circuit of FIG. 14, step 305 is different, in that one of the three differential amplifiers is selected for connection to the A-D converter for voltage measurement. This is performed by a binary control signal output on lines C1 and C2 of the micro-controller. With C1 and C2 both at 0V, differential amplifier 1403 is selected. With C1 and C2 at 5V and 0V respectively, differential amplifier 1404 is selected. With C1 and C2 at 0V and 5V respectively, differential amplifier 1405 is selected. One of these three conditions is selected at step 305, and at step 306 electrical conditions are allowed to settle and the micro-controller then waits for the next timer interrupt before a measurement is made of the selected voltage.

Constant current source 1401 is a low cost part, such as an LM334H, which is manufactured by SGS Thompson. The precise current from this part, and also other characteristics of the circuit that are assumed to remain constant, may be difficult to determine as it may vary according to manufacturing tolerances, or during use in response to temperature, humidity and other environmental variations. Characteristics of these variations are taken into account by calibration circuitry, comprising a calibration resistor 1451 and a CMOS switch 1408. This circuit is used while the sensor is not conducting. The micro-controller is able to dose the CMOS switch 1408 by setting control line C0 to 5V. Thereafter, current flows through the calibration resistor 1451.

Provided that no current is flowing through the central layer of the position sensor 101, the current flowing through the resistor is the same as the current that will flow through the sensor when a force is applied to the sensor to cause conduction through the central layer 104. Because the resistance value of the calibration resistor is known, and this does not change significantly due to temperature or other environmental characteristics, the current through it may be determined by measuring the voltage across it, as performed by differential amplifier 1404.

Furthermore, it is possible to obtain resistance measurements for the outer planes 102 and 103, as this same current is now flowing entirely across both these planes. The voltage developed across connections 107 and 108, under these conditions, is the maximum voltage that can be generated from this plane 102 as a result of mechanical interactions. The minimum voltage is always zero. Thus, during calibration, the voltage measured by amplifier 1403 determines a scaling factor to be used whenever the position of a mechanical interaction is determined with respect to the top plane 102. Similarly, the lower plane 103 may be calibrated in this way, with the full range being defined by a minimum of zero volts, to a maximum defined by the voltage measured across connections 111 and 112 during calibration. This provides highly accurate calibration data, that may be used to determine position measurements with a high degree of accuracy, and with a highly simplified and low cost circuit.

In an alternative embodiment, the calibration resistor 1451 is excluded, and simply replaced by a link. Thus, when switch 1408 is conducting, current flows directly from connection 108 to connection 112. The voltages developed across planes 107 and 108 are unaffected by this modification.

The absolute value of the constant current generated by the constant current source itself is not required as a measurement. It is the ratio of the current through the calibration resistor 1451, to the voltages that are measured during sensor operation, that enables environmental factors and manufacturing variations to be counteracted. Since the current is determined by measuring the voltage across the calibration resistor, this calibration voltage is all that is required in subsequent calculations to determine the characteristics of mechanical interactions. The constant current emitted by the current source 1401 itself, need only fall within bounds of viable circuit operation, and thus a reasonable manufacturing variation in this value may be accounted for by use of this type of circuit. Typically, x position may be calculated using the measured reading for the position with the calibration resistor switched out divided by the last calibration reading representing maximum x. Y position may be calculated in a similar way. Similarly z reading related to force and area may be calculated using the measured reading for Rv, or the contact resistance, divided by the last available reading of voltage across the calibration resistor.

The micro-controller may perform a calibration cycle periodically, for example, once every second, depending on how quickly the environment is expected to change. In some applications, calibration need only be performed once when the system is powered up, and perhaps once every hour or day thereafter.

Alternatively, the micro-controller may cause the circuit to remain in calibration mode, and to monitor the voltage across the calibration resistor continuously. A sharp change in voltage indicates that a non-environmental change has occurred, due probably to conduction of the sensor via its central layer 104. When a sharp change of this kind is observed, the micro-controller ends calibration, and performs position measurements as described above. The calibration value used is the same value as was observed continuously prior to the sharp change. Signal processing methods may be applied both to determine the relatively constant calibration voltage across the resistor 1451, and to determine a rate of change indicative of sensor activation. For example, a kalman filter may be used to determine the steady state calibration voltage, and comparisons between the output from the kalman filter and the instantaneous voltage across the resistor 1451 may be used to determine whether or not the sensor has been activated. Once the sensor is no longer conducting, calibration may be selected again.

In an alternative embodiment, the circuit of FIG. 14 is modified to include additional CMOS switches controlled by the micro-controller 1402, such that the connections 107 and 108 are swapped, and connections 111 and 112 are swapped. After these connections have been swapped, current flows through the previously non-current carrying regions of the sensor planes 102 and 103. Measurements made in this way, with the calibration circuit switched off, may be combined with measurements made in the unswapped condition, in order to improve the overall accuracy of measurements.

The multiplexer circuit 1407 is a generic CMOS 4053 integrated circuit. The micro-controller 1402 is an 80C51, manufactured by Phillips. However, in an alternative embodiment, a PIC type micro-controller may be used, as manufactured by Microchip. A part may be used that includes the A-D converter 1406, thereby reducing the unit cost of high volume manufacture. The micro-controller communicates with a computer 132 shown in FIG. 1 via a serial connection 131, or other information receiving device, to which measurements are to be supplied.

The combined sensor shown in FIG. 11 may be used with a modified version of the circuit shown in FIG. 14. In this arrangement, the lower plane 1404 of the top sensor is also the top plane 1404 of the lower sensor. Under the application of a force, conduction occurs through the central layers 1105 and 1103 of both sensors, through the common plane 1104. A potential developed at plane 1104 may be measured by a single connection made to it, and from this potential, the voltages sustained across the central layers 1103 and 1105 may be independently identified. Voltages sustained as a result of current flow across the top plane 1106, to determine x position, and lower plane 1102, to determine y position, may be made in the manner previously described for a constant current measuring system in a single sensor. An implementation of this arrangement requires only an additional differential amplifier and connection to the multiplexer 1407. Thus, additional layers can be used with minimum complexity of additional control circuitry.

What is claimed is:

1. A method of detecting the position of a mechanical interaction in a sensor constructed from fabric, wherein a substantially constant electric current is established through said elements, said method comprising:

measuring a first electrical potential developed in a first plane in response to said current;

measuring a second electrical potential developed in a second plane in response to said current;

processing said measurements to identify a position of said mechanical interaction, and connecting a calibration circuit that provides an alternative route for current flow through said first plane and through said second plane.

2. A method as in claim 1, further including:

measuring a third potential developed between said first plane and said second plane; and processing said third potential to identify an additional characteristic of said mechanical interaction.

3. A method as in claim 1, wherein said calibration circuit facilitates:
   identifying a first voltage range in said first plane; and
   identifying a second voltage range in said second plane.

4. A method as in claim 3, wherein said identified ranges are used with at least one of said measured potentials in order to identify a position of a mechanical interaction.

5. A method as in claim 1, wherein a calibration signal developed as a result of current flowing through said calibration circuit, is monitored to identify the onset of conduction between said first and second planes as a result of a mechanical interaction.

6. A method as in claim 1, including:
   switching said route of current flow in response to an analysis of sensor conditions.

7. A method as in claim 1, wherein said first plane has a first and second connection point and said second plane is connectable at third and fourth connection points, further including:
   supplying said constant current to said first plane at said first connection point;
   sinking said constant current from said second plane at said fourth connection point;
   measuring a potential in said sensor;
   swapping said first and second connection, and swapping said third and fourth connections;
   repeating the measurement of said potential in said sensor; and
   combining said repeated measurements to determine a characteristic of mechanical interaction in said sensor.

8. In a sensor comprising a first outer plane through which a substantially constant current flows to develop a first potential; an inner plane, which, in combination with said first outer plane, has been constructed substantially to respond to the force area product of mechanical interactions; a second outer plane, through which said constant current also flows to develop a second potential, which, in combination with said inner plane, has been constructed substantially to respond to the area of mechanical interactions; and calibration means, a method of detecting an indication of applied force of a mechanical interaction, said method comprising:
   measuring a third potential developed between said first outer plane and said inner plane;
   measuring a fourth potential between said inner plane and said second outer plane;
   processing said third potential with said fourth potential to identify an indication of the force of mechanical interactions; and
   conducting said constant current by an alternative route to that used during position detection via said calibration means so as to calibrate the voltage ranges across said first outer plane and said second outer plane.

9. A method as in claim 8, further comprising:
   processing said first potential to identify a first co-ordinate of said mechanical interaction; and
   processing said second potential to identify a second co-ordinate of said mechanical interaction.

10. A position detector constructed from fabric comprising:
    at first conductive plane and a second conductive plane;
    processing means configured to conduct a substantially constant electric current through said first and second planes to identify the position of a mechanical interaction; and
    calibration means configured to conduct said constant current by an alternative route to that used during position measurement so as to calibrate the voltage range across said first conductive plane and said second conductive plane.

11. A position detector as in claim 10, wherein said detector is configured so as to measure the voltage between said planes in order to determine an additional characteristic of said mechanical interaction.

12. A position detector as in claim 10, wherein said calibration means facilitates steps of:
    identifying a first voltage range in said first plane; and
    identifying a second voltage range in said second plane.

13. A position detector as in claim 12, wherein said processing means is arranged to process said identified ranges with representations of voltages developed in said fabric sensor while said calibration means is inactive.

14. A position detector as in claim 10, wherein said processing means is arranged to monitor voltages developed during calibration, thereby to identify:
    the onset of conduction between said first and second planes.

15. A position detector as in claim 10, wherein said processing means is configured to switch said route of said current flow in response to an analysis of sensor conditions.

16. A position detector as in claim 10, wherein said first plane has a first and second connection point and said second plane is connectable at third and fourth connection points, further including switching means controllable to:
    supply said constant current to said first plane at said first connection point;
    sink said constant current from said second plane at said fourth connection point; and
    swap said first and second connection, and, swap said third and fourth connections.

* * * * *